United States Patent
Mahadevan et al.

(10) Patent No.: US 9,154,408 B2
(45) Date of Patent: Oct. 6, 2015

(54) SYSTEM AND METHOD FOR TRAFFIC POLARIZATION DURING FAILURES

(71) Applicant: Dell Products L.P., Round Rock, TX (US)

(72) Inventors: Ramasubramani Mahadevan, Tamilnadu (IN); Pathangi Narasimhan Janardhanan, Tamilnadu (IN); Avinash Natarajan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 13/777,301

(22) Filed: Feb. 26, 2013

(65) Prior Publication Data

US 2014/0241146 A1 Aug. 28, 2014

(51) Int. Cl.
| | |
|---|---|
| *H04L 12/26* | (2006.01) |
| *H04L 12/703* | (2013.01) |
| *H04L 29/14* | (2006.01) |
| *H04L 12/707* | (2013.01) |
| *H04L 12/709* | (2013.01) |

(52) U.S. Cl.
CPC ............. *H04L 45/28* (2013.01); *H04L 69/40* (2013.01); *H04L 45/22* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 5,555,404 A | 9/1996 | Torbjornsen et al. | |
| 5,715,237 A * | 2/1998 | Akiyoshi | 370/228 |
| 6,583,903 B1 | 6/2003 | Way et al. | |
| 7,093,027 B1 * | 8/2006 | Shabtay et al. | 709/239 |
| 7,447,149 B1 | 11/2008 | Beesley et al. | |
| 8,213,300 B1 * | 7/2012 | Osswald et al. | 370/218 |
| 2003/0031126 A1 | 2/2003 | Mayweather et al. | |
| 2005/0138203 A1 * | 6/2005 | Taylor et al. | 709/239 |
| 2005/0243713 A1 * | 11/2005 | Okuda | 370/216 |
| 2008/0002570 A1 * | 1/2008 | Kurokawa et al. | 370/219 |

(Continued)

FOREIGN PATENT DOCUMENTS

EP         1376907 A1      1/2004

OTHER PUBLICATIONS

PCT International Search Report and Written Opinion mailed Dec. 5, 2013, in related International Application No. PCT/US2013/058063.

(Continued)

*Primary Examiner* — Ian N Moore
*Assistant Examiner* — Phong La
(74) *Attorney, Agent, or Firm* — Haynes and Boone, LLP

(57) ABSTRACT

A system and method for traffic polarization during failures includes a communication network cluster including a first network switching unit configured to communicate with a first network node via a first network link and a second network node via a second network link, a second network switching unit configured to communicate with the first network node via a third network link and the second network node via a fourth network link, and a first intra-cluster link coupling the first network switching unit to the second network switching unit. The second network switching unit is further configured to respond to a failure in the fourth network link by broadcasting a route withdrawal message to the first network switching unit and the first network node. The first network switching unit is configured to accept rerouted network traffic from the first network node via the first network link resulting from the route withdrawal message.

15 Claims, 9 Drawing Sheets

(56) References Cited

U.S. PATENT DOCUMENTS

| | | |
|---|---|---|
| 2009/0201806 A1 | 8/2009 | Ding et al. |
| 2009/0252170 A1* | 10/2009 | Hu .......................... 370/395.53 |
| 2011/0299396 A1* | 12/2011 | Yan et al. ....................... 370/235 |
| 2012/0033541 A1* | 2/2012 | Jacob Da Silva et al. .... 370/217 |
| 2012/0099440 A1 | 4/2012 | Dong et al. |
| 2012/0113835 A1* | 5/2012 | Alon et al. .................... 370/252 |
| 2012/0163164 A1* | 6/2012 | Terry et al. .................... 370/221 |
| 2012/0182866 A1* | 7/2012 | Vinayagam et al. ........... 370/228 |
| 2012/0250499 A1* | 10/2012 | Osswald et al. .............. 370/221 |
| 2012/0275297 A1* | 11/2012 | Subramanian ................ 370/225 |
| 2012/0278804 A1 | 11/2012 | Narayanasamy et al. |
| 2012/0281521 A1 | 11/2012 | Shorty et al. |
| 2013/0016606 A1* | 1/2013 | Cirkovic et al. .............. 370/225 |
| 2014/0086100 A1* | 3/2014 | Keesara et al. ............... 370/255 |

OTHER PUBLICATIONS

Medard et al., "Network Reliability and Fault Tolerance", In: Encyclopedia of Telecommunications, Apr. 15, 2003.

* cited by examiner

SYSTEM AND METHOD FOR TRAFFIC POLARIZATION DURING FAILURES

BACKGROUND

The present disclosure relates generally to information handling systems, and more particularly to traffic polarization in network switching products during network link failures.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of a virtual network or VLAN and/or using virtual link trunking (VLT). In a VLAN and/or a VLT, multiple network links and/or nodes are often bundled into a group to support the parallelization function. For suitably aware network switching products, the VLAN and/or VLT can offer a flexible option to select any of the network links in the VLAN and/or VLT. The network switching products may also ignore the VLAN and treat the network links as separate links and utilize them in a more traditional fashion. And while VLANs and VLTs offer additional flexibility in network topologies they also add complexity to the forwarding function.

One function of network switching products is to gracefully deal with failures in the networks they are receiving network packets from or forwarding packets to. For example, the network switching products should be able to deal with failures in the network lines between themselves and their neighboring network switching products.

Accordingly, it would be desirable to provide improved network switching products that can deal with network failures by forwarding around failure points while minimizing adverse impact on network traffic. It would also be desirable to provide network switching products that can deal with network failures while taking advantage of the features of VLANs and VLTs.

SUMMARY

According to one embodiment, a communication network cluster includes a first network switching unit configured to communicate with a first network node via a first network link and a second network node via a second network link, a second network switching unit configured to communicate with the first network node via a third network link and the second network node via a fourth network link, and a first intra-cluster link coupling the first network switching unit to the second network switching unit. The second network switching unit is further configured to respond to a failure in the fourth network link by broadcasting a route withdrawal message to the first network switching unit and the first network node. The first network switching unit is configured to accept rerouted network traffic from the first network node via the first network link resulting from the route withdrawal message.

According to another embodiment, a network switching device includes a first communication port configured to communicate with a first network switching unit in a cluster via a first network link and a second communication port configured to communicate with a second network switching unit in the cluster via a second network link. The network switching device is configured to, in response to receiving a route withdrawal message from the second network switching unit indicating a network failure in a third network link between the second network switching unit and a second network node, forward network traffic for the second network node to the first network switching unit via the first network link.

According to yet another embodiment, a method of forwarding network traffic in a cluster includes detecting, by a first network switching unit in a cluster, a failure in a network link coupling the first network switching unit to a first network node; broadcasting, by the first network switching unit, a route withdrawal message to a second network switching unit in the cluster and a second network node; receiving, by the second network switching unit, network traffic from the second network node resulting from the route withdrawal message; and forwarding, by the second network switching unit, the network traffic to the first network node.

According to yet another embodiment, a method of forwarding network traffic in a network switching device includes receiving, by a first network switching device, on a first network link, a route withdrawal message from a first network switching unit in a cluster indicating a network failure in a second network link between the first network switching unit and a second network switching device; and in response to the route withdrawal message, updating forwarding data structures in the first network switching device to remove the first network link as a next hop toward the second network switching device and forwarding network traffic for the second network switching device to a second network switching unit in the cluster via a third network link.

According to yet another embodiment, an information handling system includes a communications network. The communications network includes a first network node coupled to a cluster. The cluster includes a first network switching unit coupled to a second network switching unit through an intra chassis link. The first network switching unit is coupled to the first network node through a first network link. The second network switching unit is coupled to the first network node through a second network link. The first network switching unit is configured to communicate with a second network node via a third network link. The second network switching unit is configured to communicate with the second network node via a fourth network link. The second network switching unit is configured to respond to a failure in the fourth network link by broadcasting a route withdrawal message to the first network switching unit and the first network node. The first network node is configured to respond to the route withdrawal message by forwarding network traffic for the second network node to the first network switching unit through the first network link.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
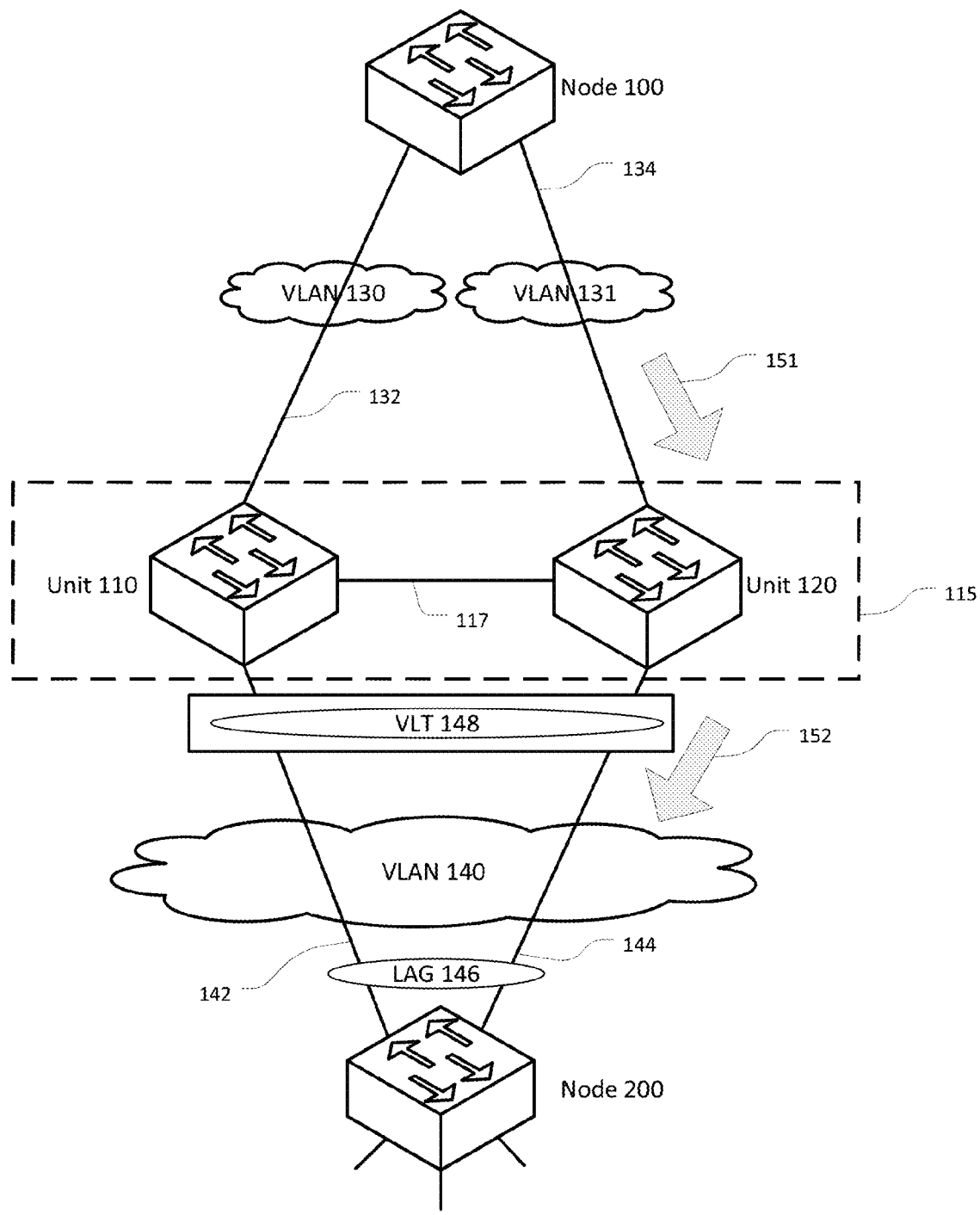
FIG. 1 shows a simplified diagram of a network including several VLANs.

FIG. 1 shows a simplified diagram of a network including several VLANs. As shown in FIG. 1, a network switching device or node 100 has several options for forwarding and/or routing network packets to a network switching device or node 200. More specifically, node 100 can forward packets to node 200 using one of several paths that utilize intervening network switch units 110 and 120. In the particular configuration of FIG. 1, node 100 may utilize VLAN 130 to reach unit 110 along network link 132 and VLAN 131 to reach unit 120 along network link 134. Node 100 may use corresponding communication ports to send and receive network traffic on network links 132 and 134. Although network link 132 and network link 134 are not strictly in parallel with each other, they may form a VLAN because unit 110 and unit 120 are grouped into a cluster 115. Even though the cluster 115 is composed of separate unit 110 and unit 120, unit 110 and unit 120 may be treated as the same device for forwarding purposes. This is possible because, in part, unit 110 and unit 120 maintain an intra chassis link (ICL) 117 that allows unit 110 and unit 120 to share network traffic and communicate between themselves. In the particular example of FIG. 1, node 100 is not treating unit 110 and unit 120 as if they belong to the cluster 115, but is rather viewing network links 132 and 134 as separate network links on the separate VLANs 130 and 131, respectively.

Similarly, node 200 may utilize VLAN 140 to reach either unit 110 along network link 142 or reach unit 120 along network link 144. Node 200, however, is treating unit 110 and unit 120 as the cluster 115. More particularly, node 200 is maintaining network link 142 and network link 144 in a link aggregation group 146. This means that node 200 is more fully aware of the parallel nature of network links 142 and 144 and may be able to more fully utilize the features of VLAN 140. Collectively network links 142 and 144 may also form a VLAN trunk (VLT) 148 between node 200 and cluster 115.

As depicted in FIG. 1, node 100 is currently sending packets toward node 200 and beyond using one of the possible paths in the network. More specifically, the forwarding algorithms of node 100 have identified that a usable next step or hop towards node 200 is along network link 134 to unit 120 as depicted by the flow arrow 151. Unit 120 recognizes that it has a direct link to node 200 using network link 144 as depicted by the flow arrow 152. In this configuration, packets from node 100 to node 200 require two hops, the first along network link 134 to unit 120 and the second along network link 144 to node 200. Alternatively, the parallelization in the network could have been utilized to provide a two-hop route along network link 132 to unit 110 and then along network link 142 to node 200. In general it would be less desirable to use ICL 117 to route between node 100 and node 200 as this would be a three-hop route involving a longer path and requires more network switching resources.

Figure 2:
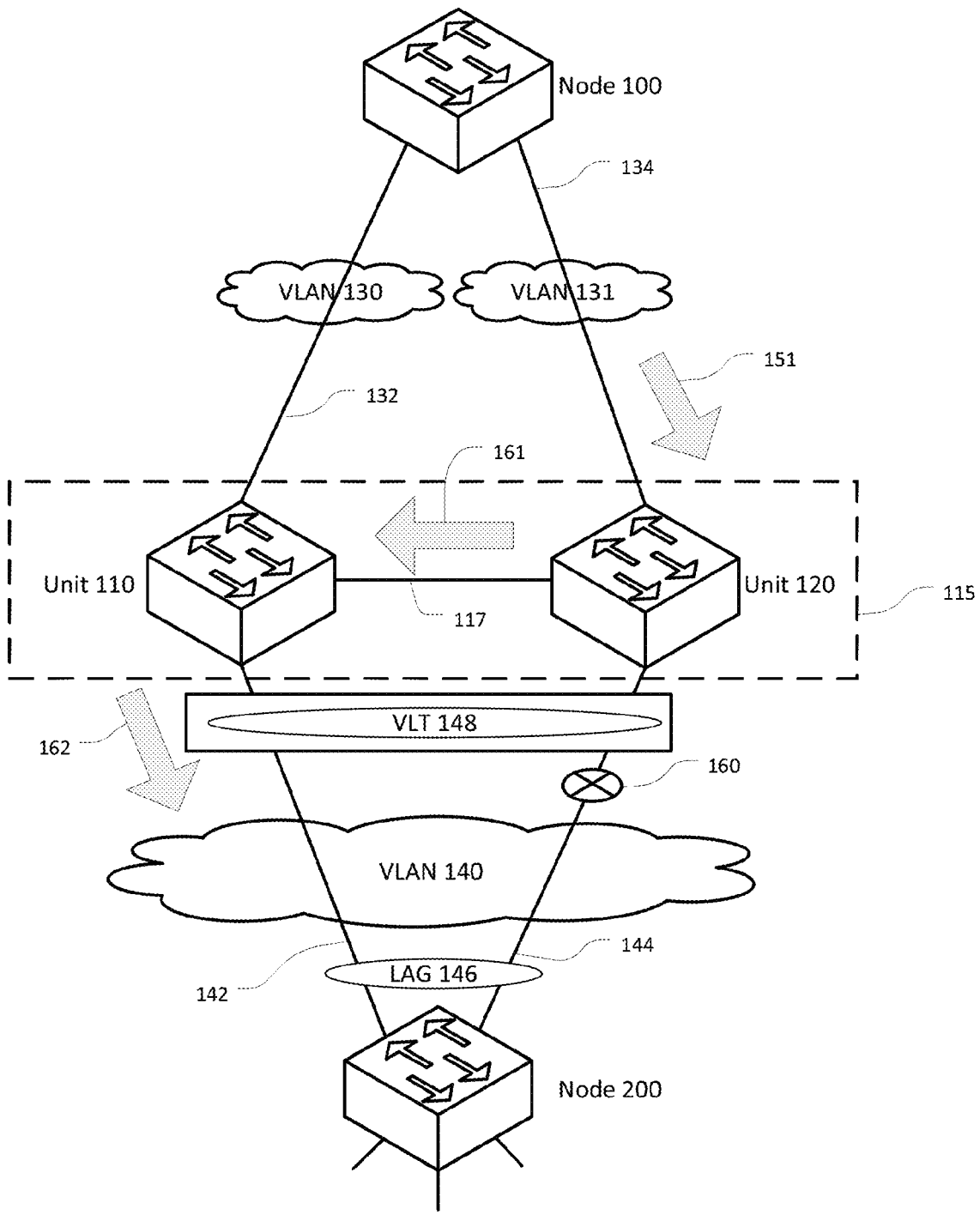
FIG. 2 shows a simplified diagram of the network of FIG. 1 with a failure in a network link.

FIG. 2 shows a simplified diagram of the network of FIG. 1 with a failure 160 in the network link 144. As shown in FIG. 2, the network link 144 has failed as depicted at point 160. As a result of the failure 160, it is no longer possible for packets to be forwarded from unit 120 to node 200 along network link 144. In a network without parallelization or redundancy, this might isolate node 200 and points beyond in the network. Such is not the case here. Unit 120 is aware that it is part of cluster 115 and VLT 148. As a result, unit 120 knows that it has peer units, specifically unit 110 that can also reach node 200. Thus, when unit 120 receives packets from node 100 along network link 134 as depicted by flow arrow 151, unit 120 is able to locally forward around the failure 160. Unit 120 may do this by forwarding packets for node 200 to unit 110 along ICL 117 as depicted by flow arrow 161. Once the packets arrive at unit 110 they may be forwarded along network link 142 to node 200 as depicted by flow arrow 162. This forwarding approach demonstrates one advantage of network parallelization and shows how network failures may be addressed using a purely local forwarding approach.

The forwarding approach of FIG. 2, however, is not particularly efficient. Aside from the obvious problem that it requires packets moving from node 100 to node 200 to take three hops rather than the possible two, it also introduces other inefficiencies. For example, the three-hop route is not the shortest path from node 100 to node 200. The network of FIG. 2 has links so that the packet could move from node 100 to node 200 using network link 132 to unit 110 and then network link 142 to node 200 using only two hops. Additionally, the three-hop forwarding path of FIG. 2 uses unit 120 thus consuming the resources of unit 120 unnecessarily. The three-hop forwarding path also takes up bandwidth on ICL 117, potentially causing it to be oversubscribed and unable to support the rest of the network traffic it needs to sustain. Consequently, it would be desirable to have a simple forwarding strategy that allows the network of FIG. 2 to forward network traffic and avoid the failure 160 while taking better advantage of the parallelization in the network.

Figure 3:
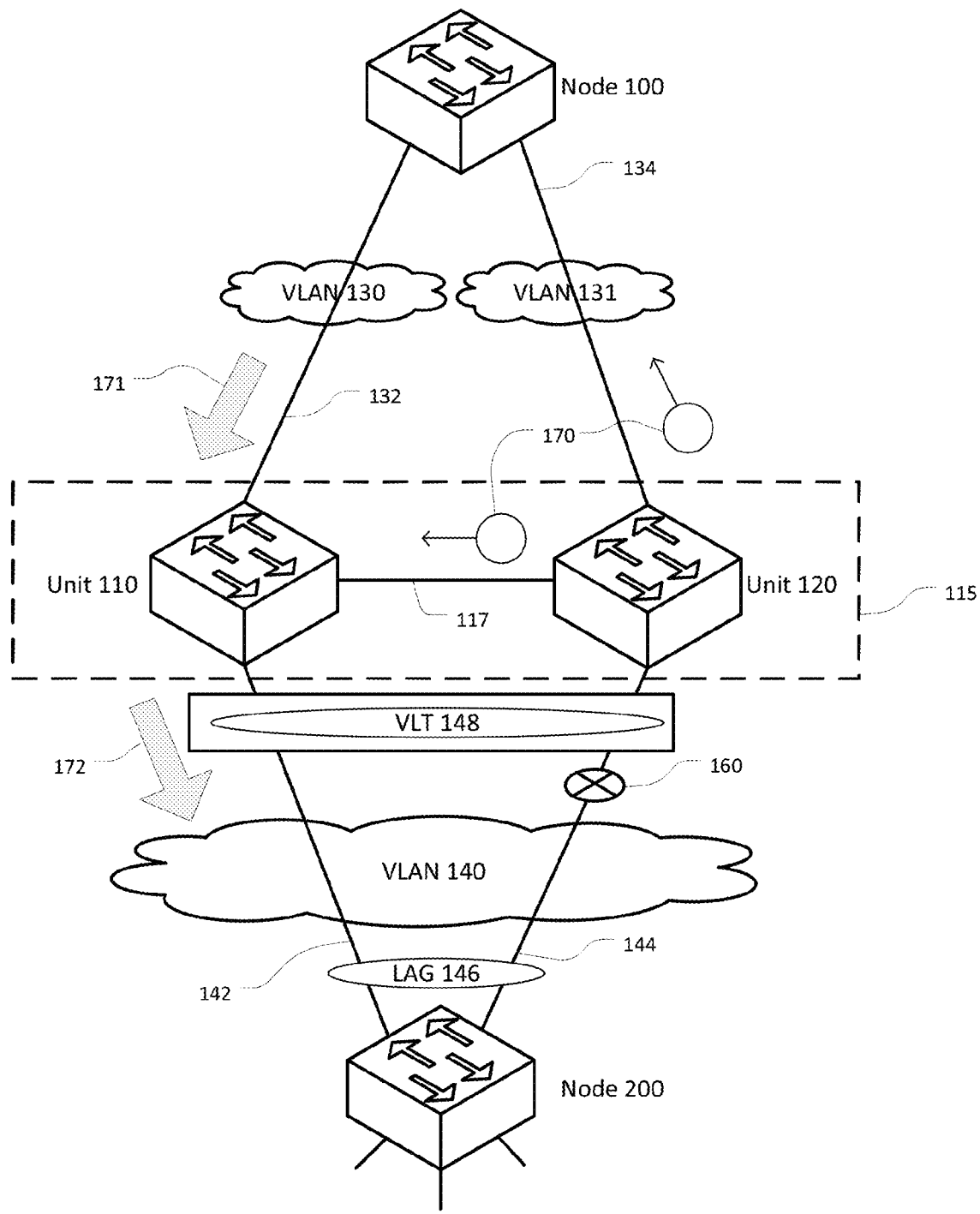
FIG. 3 is a simplified diagram of the network of FIGS. 1 and 2 more efficiently forwarding network traffic around the failure in the network link according to some embodiments.

FIG. 3 is a simplified diagram of the network of FIGS. 1 and 2 more efficiently forwarding network traffic around the failure 160 in the network link 144 according to some embodiments. As shown in FIG. 3, unit 120 does not address the forwarding problem by redirecting packets along the ICL 117 as shown in FIG. 2. More specifically, unit 120 may address the failure 160 by broadcasting a route withdrawal message 170 to each of its neighboring network switching devices. In some embodiments, the route withdrawal message 170 may be a prefix withdrawal message under an Interior Gateway Protocol (IGP). When the route withdrawal message 170 is received by node 100 over network link 134, node 100 updates its forwarding data structures and recognizes that the VLAN 140 is now only reachable through network link 132. This has the desired effect of having node 100 direct or polarize packets for node 200 directly to unit 110 along network link 132.

When the route withdrawal message 170 is received by unit 110 over ICL 117, unit 110 would ignore the route withdrawal message 170 by recognizing that it already has a direct route to node 200 along network link 142. As a result, node 100 may now forward packets for node 200 along network link 132 to unit 110 as depicted by flow arrow 171. Once the packets arrive at unit 110 they may then be forwarded to node 200 along network link 142 as depicted by flow arrow 172. Thus, a two-hop path is maintained between node 100 and node 200 that does not unnecessarily consume the resources of ICL 117 or unit 120.

When failure 160 is corrected and network link 144 is again available between unit 120 and node 200, the effects of the route withdrawal message 170 may be reversed. Unit 120, recognizing that network link 144 is again available, may broadcast a route reachability message to the neighboring network switching devices, and node 100 may update its forwarding data structures accordingly.

As discussed above and further emphasized here, FIGS. 1, 2 and 3 are merely examples, which should not unduly limit the scope of the claims. One of ordinary skill in the art would recognize many variations, alternatives, and modifications. According to some embodiments, the cluster 115 may include more than two units functioning in parallel. This arrangement allows node 100 to choose from multiple two-hop paths that still exist between node 100 and node 200 through cluster 115 during failure 160. According to some embodiments, the forwarding approach may be used to forward layer 2 network traffic around the failure 160. According to some embodiments, the forwarding approach may be used to forward layer 3 network traffic around the failure 160.

Figure 4:
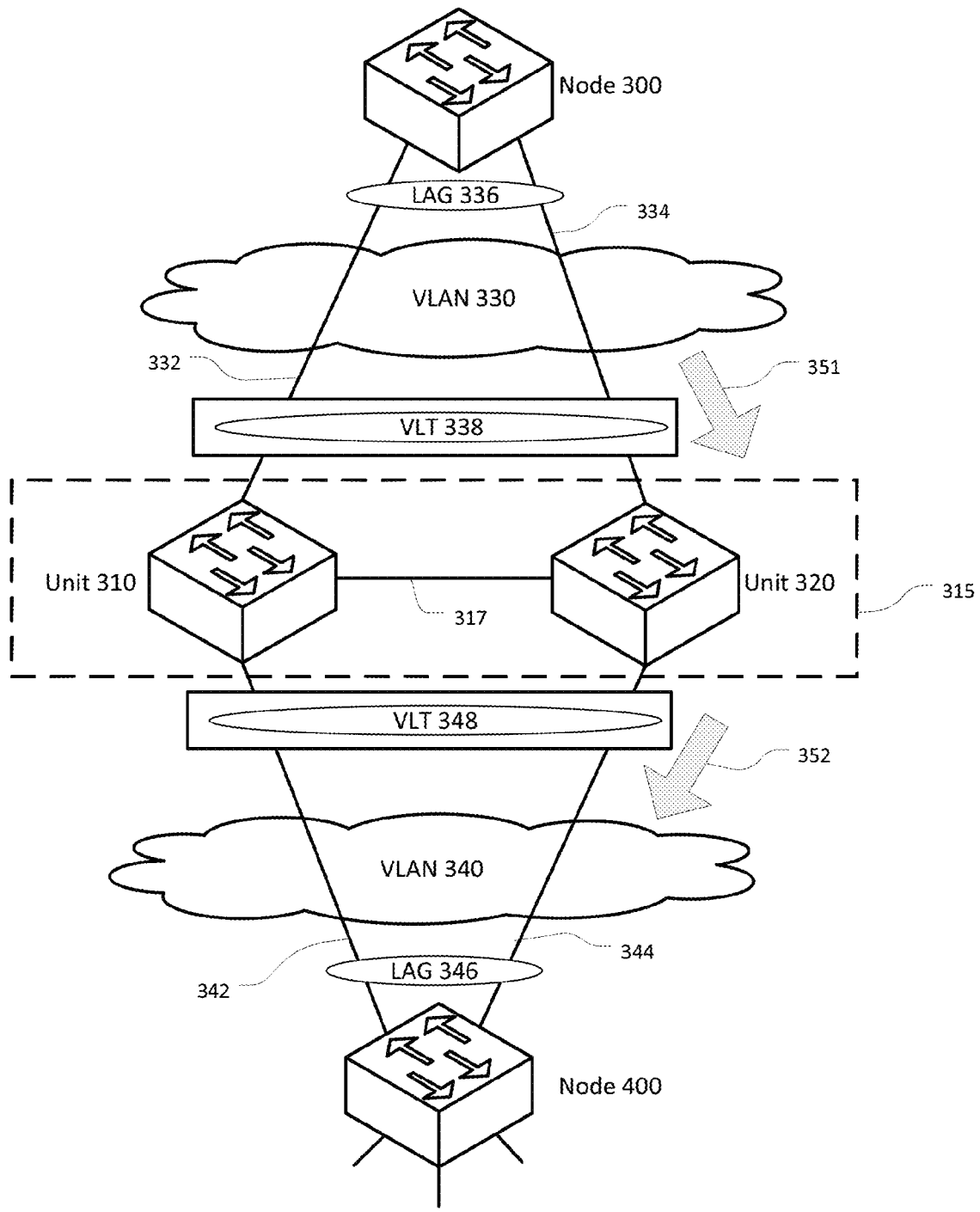
FIG. 4 shows a simplified diagram of a network including several VLANs.

FIG. 4 shows a simplified diagram of a network including several VLANs. As shown in FIG. 4, a node 300 has several options for forwarding and/or routing network packets to a node 400. More specifically, node 300 can forward packets to node 400 using one of several paths that utilize intervening network switch units 310 and 320. In the particular configuration of FIG. 4, node 300 may utilize VLAN 330 to reach either unit 310 along network link 332 or reach unit 320 along network link 334. Although network link 332 and network link 334 are not strictly in parallel with each other, they may form a VLAN because unit 310 and unit 320 are grouped into a cluster 315. Even though the cluster 315 is composed of separate unit 310 and unit 320, unit 310 and unit 320 may be treated as the same device for forwarding purposes. This is possible because, in part, unit 310 and unit 320 maintain an ICL 317 that allows unit 310 and unit 320 to share network traffic and communicate between themselves. This means that network switching products such as node 300 may address unit 310 and unit 320 using the same prefix. In the particular example of FIG. 4, node 300 is maintaining network link 332 and network link 334 in a link aggregation group 346. This means that node 300 is aware of the parallel nature of network links 332 and 334 and may be able to more fully utilize the features of VLAN 330. Collectively network links 332 and 334 may also form a VLT 338 between node 300 and cluster 315.

As also shown in FIG. 4, node 400 may utilize VLAN 340 to reach either unit 310 along network link 342 or reach unit 320 along network link 344. Node 400 is treating unit 310 and unit 320 as the cluster 315. More particularly, node 400 is maintaining network link 342 and network link 344 in a link aggregation group 346. This means that node 400 is more aware of the parallel nature of network links 342 and 344 and may be able to more fully utilize the features of VLAN 340. Collectively network links 342 and 344 may also form a VLT 348 between node 400 and cluster 315.

As depicted in FIG. 4, node 300 is currently sending packets toward node 400 and beyond using one of the possible paths in the network. More specifically, the forwarding algorithms of node 300 have identified that a usable next step or hop towards node 400 is along network link 334 to unit 320 as depicted by the flow arrow 351. In other words, node 300 is utilizing LAG 346 to reach cluster 315 and is hashing or selecting to use network link 334 from LAG 346 to do so. Unit 320 recognizes that it has a direct link to node 400 using network link 344 as depicted by the flow arrow 352. In this configuration, packets from node 300 to node 400 require two hops, the first along network link 334 to unit 320 and the second along network link 344 to node 400. Alternatively, the parallelization in the network could have been utilized to provide a two-hop route along network link 332 to unit 310 and then along network link 342 to node 400, but node 300 has selected network link 334 from LAG 336 over network link 332 for traffic to node 400. In general it would be less desirable to use ICL 317 to forward between node 300 and node 400 as this would be a three-hop route involving a longer path requiring more network switching resources.

Figure 5:
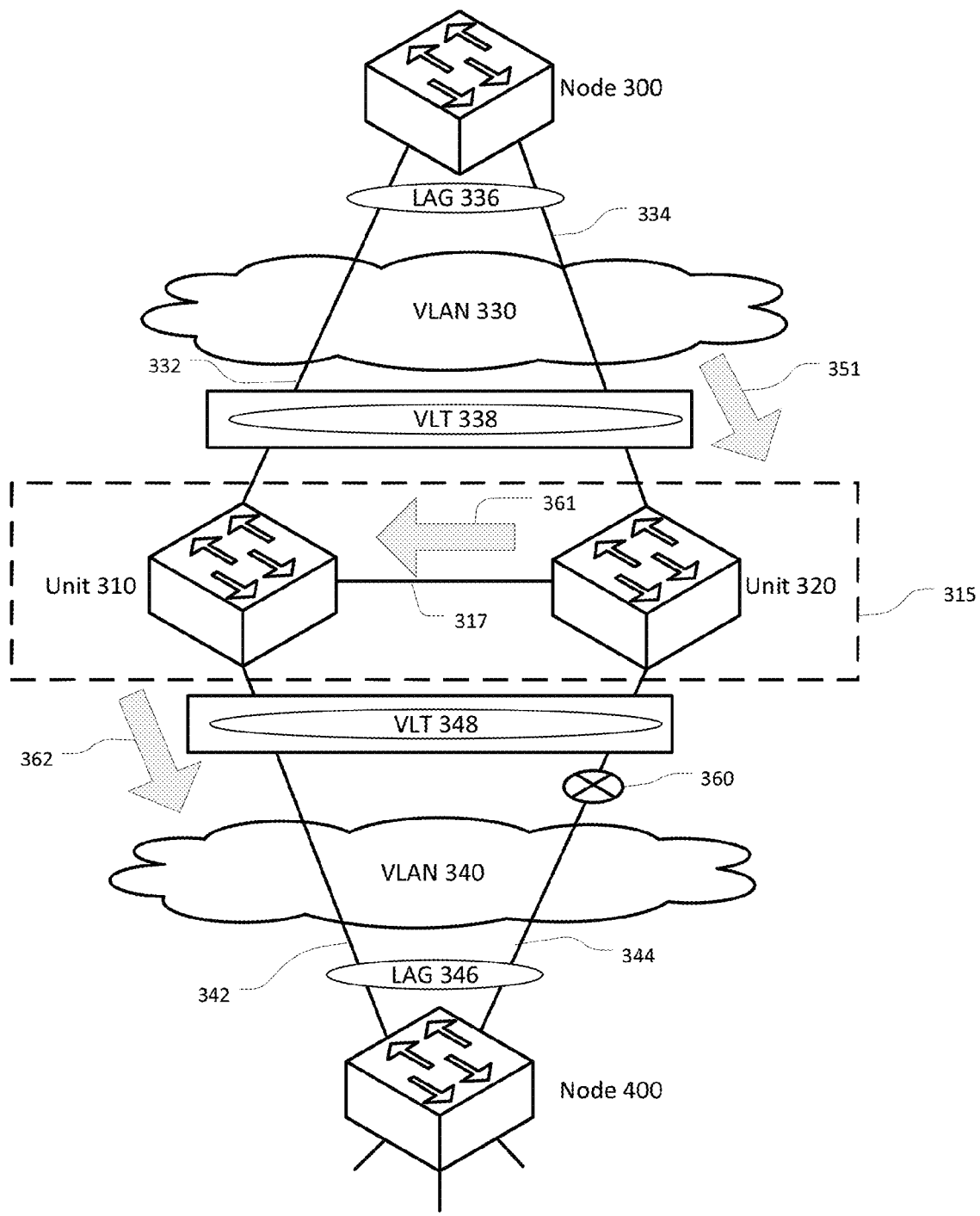
FIG. 5 shows a simplified diagram of the network of FIG. 4 with a failure in a network link.

FIG. 5 shows a simplified diagram of the network of FIG. 4 with a failure 360 in the network link 344. As shown in FIG. 5, the network link 344 has failed as depicted at point 360. As a result of the failure 360, it is no longer possible for packets to be forwarded from unit 320 to node 400 along network link 344. In a network without parallelization or redundancy, this might isolate node 400 and points beyond in the network. Such is not the case here. Unit 320 is aware that it is part of cluster 315 and VLT 348. As a result, unit 320 knows that it has peer units, specifically unit 310 that can also reach node 400. Thus, when unit 320 receives packets from node 300 along network link 334 as depicted by flow arrow 351, unit 320 is able to locally forward around the failure 360. Unit 320 may do this by forwarding packets for node 400 to unit 310 along ICL 317 as depicted by flow arrow 361. Once the packets arrive at unit 310 they are forwarded along network link 342 to node 400 as depicted by flow arrow 362. This forwarding approach demonstrates one advantage of network parallelization and shows how network failures may be addressed using a purely local forwarding approach.

The forwarding approach of FIG. 5, however, is not particularly efficient. Aside from the obvious problem that it requires packets moving from node 300 to node 400 to take three hops rather than the possible two, it also introduces other inefficiencies. For example, the three-hop route is not the shortest path from node 300 to node 400. The network of FIG. 5 has links so that the packet could move from node 300 to node 400 using network link 332 to unit 310 and then network link 342 to node 400 using only two hops. Additionally, the three-hop forwarding path of FIG. 5 uses unit 320 thus consuming the resources of unit 320 unnecessarily. The three-hop forwarding path also takes up bandwidth on ICL 317, potentially causing it to be oversubscribed and unable to support the rest of the network traffic it needs to sustain. Consequently, it would be desirable to have a simple forwarding strategy that allows the network of FIG. 5 to forward network traffic and avoid the failure 360 while taking better advantage of the parallelization in the network.

Figure 6:
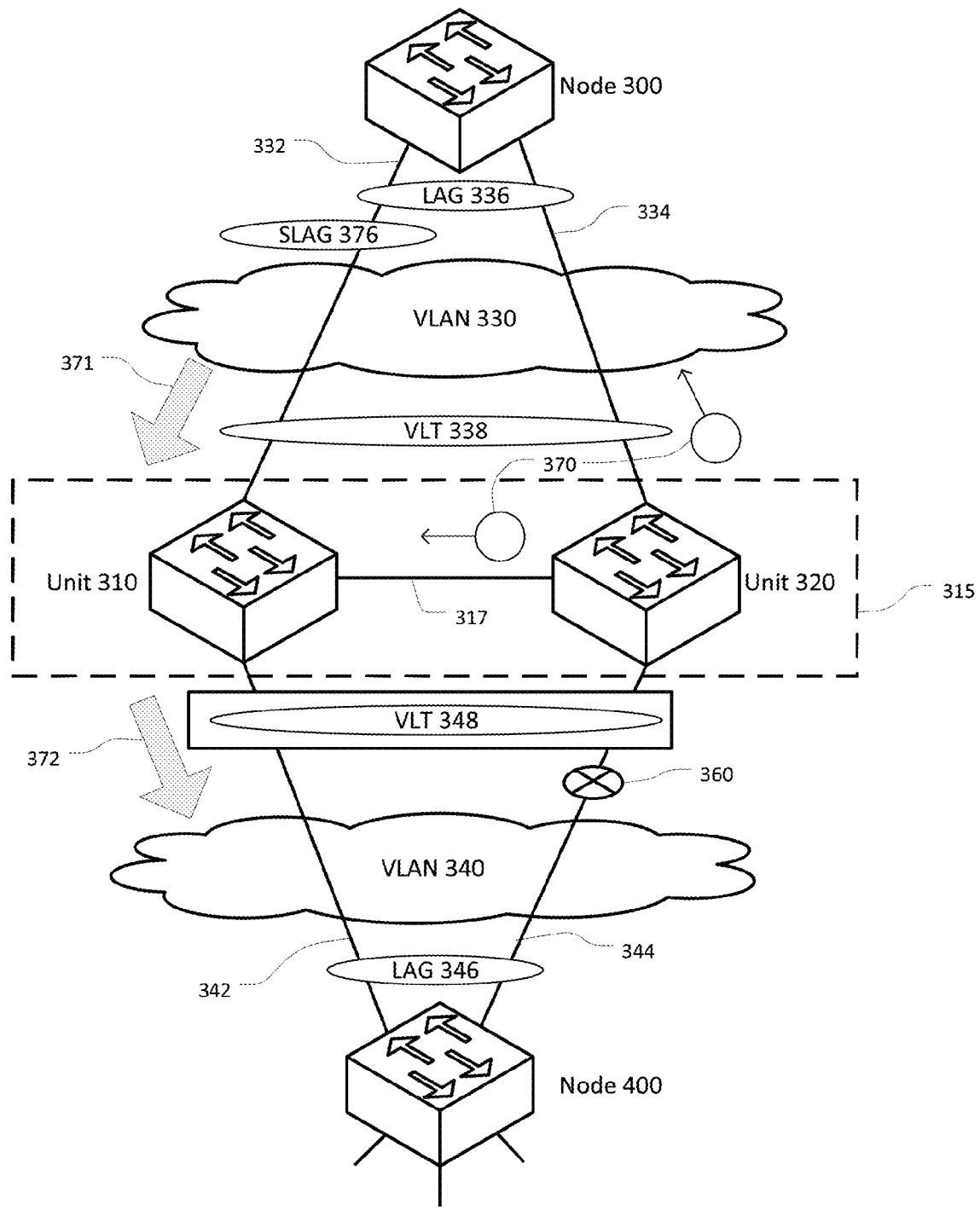
FIG. 6 shows a simplified diagram of the network of FIGS. 4 and 5 more efficiently forwarding network traffic around the failure in the network link according to some embodiments.

FIG. 6 shows a simplified diagram of the network of FIGS. 4 and 5 more efficiently forward network traffic around the failure 360 in the network link 344 according to some embodiments. As shown in FIG. 6, unit 320 does not address the forwarding problem by redirecting packets along the ICL 317 as shown in FIG. 5. More specifically, unit 320 may address the failure 360 by broadcasting a route withdrawal message 370 to each of its neighboring network switching devices. In some embodiments, the route withdrawal message 370 may be a prefix withdrawal message under an IGP. When the route withdrawal message 370 is received by node 300 over network link 334, node 300 updates its forwarding data structures and recognizes that the VLAN 330 is now only reachable through network link 332. Node 300 may accomplish this update by replacing LAG 346 with a sub-LAG (SLAG) 376. The SLAG 376 can contain all of the network links in LAG 346 except for network link 334, which has been withdrawn as a result of the route withdrawal message 370. Node 300 may now use SLAG 376 to forward packets to VLAN 330, VLT 348, and cluster 315. In some embodiments, upon receiving the route withdrawal message 170, the node 100 may update its ARP data structures so that IP addresses that previously mapped to cluster 115 using LAG 336 would now be mapped using SLAG 376. In some embodiments, the associations between the network links 332 and 334 with the LAG 336 and the SLAG 376 may be communicated using vendor-specific type-length-value (TLV) extensions to the Link Layer Discover Protocol (LLDP). In some examples, by sharing cluster IDs and unit and/or router IDs, the node 300 may create a data structure relating a cluster ID-router ID pair to a corresponding SLAG. In some examples, the route withdrawal message may be used to help create and/or identify the SLAG 376. This has the desired effect of having node 300 direct or polarize packets for node 400 using other network links than network link 334. As shown in FIG. 6, node 300 may now forward packets for node 400 to unit 310 along network link 332.

When the route withdrawal message 370 is received by unit 310 over ICL 317, unit 310 would ignore the route withdrawal message 370 by recognizing that it already has a direct route to node 400 along network link 342. As a result, node 300 may now forward packets for node 400 along network link 332 to unit 310 as depicted by flow arrow 371. Once the packets arrive at unit 310 they may then be forwarded to node 400 along network link 342 as depicted by flow arrow 372. Thus, a two-hop path is maintained between node 300 and node 400 that does not unnecessarily consume the resources of ICL 317 or unit 320.

When failure 360 is corrected and network link 344 is again available between unit 320 and node 400, the effects of the route withdrawal message 370 may be reversed. Unit 320, recognizing that network link 344 is again available, may broadcast a route reachability message to the neighboring network switching devices, and node 300 may update its forwarding data structures accordingly. Node 300 could add network link 334 to SLAG 376 and may begin using LAG 336 again for network traffic forwarding purposes. This would make network link 334 available for use in forwarding packets between node 300 and cluster 315 using LAG 336.

As discussed above and further emphasized here, FIGS. 4, 5 and 6 are merely examples, which should not unduly limit the scope of the claims. One of ordinary skill in the art would recognize many variations, alternatives, and modifications. According to some embodiments, the cluster 315 may include more than two units functioning in parallel. This arrangement allows node 300 to choose from multiple two-hop paths that still exist between node 300 and node 400 through cluster 315 during failure 360. In this case, SLAG 376 would include at least two network links including network link 332. According to some embodiments, units 310 and 320 may be a combined single unit. In this case network link 332 and network link 334 are in parallel with the parallelization known to node 300 through its use of the LAG 336. When the combined single unit detects the failure 360 it may still broadcast the route withdrawal message 370 to its nearest neighbors, which in the case of FIG. 6 would be node 300. Node 300 could still respond in the same fashion by creating SLAG 376 containing all the network links of LAG 336 except for network link 334. According to some embodiments, the forwarding approach may be used to forward layer 2 network traffic around the failure 360. According to some embodiments, the forwarding approach may be used to forward layer 3 network traffic around the failure 360.

Figure 7:
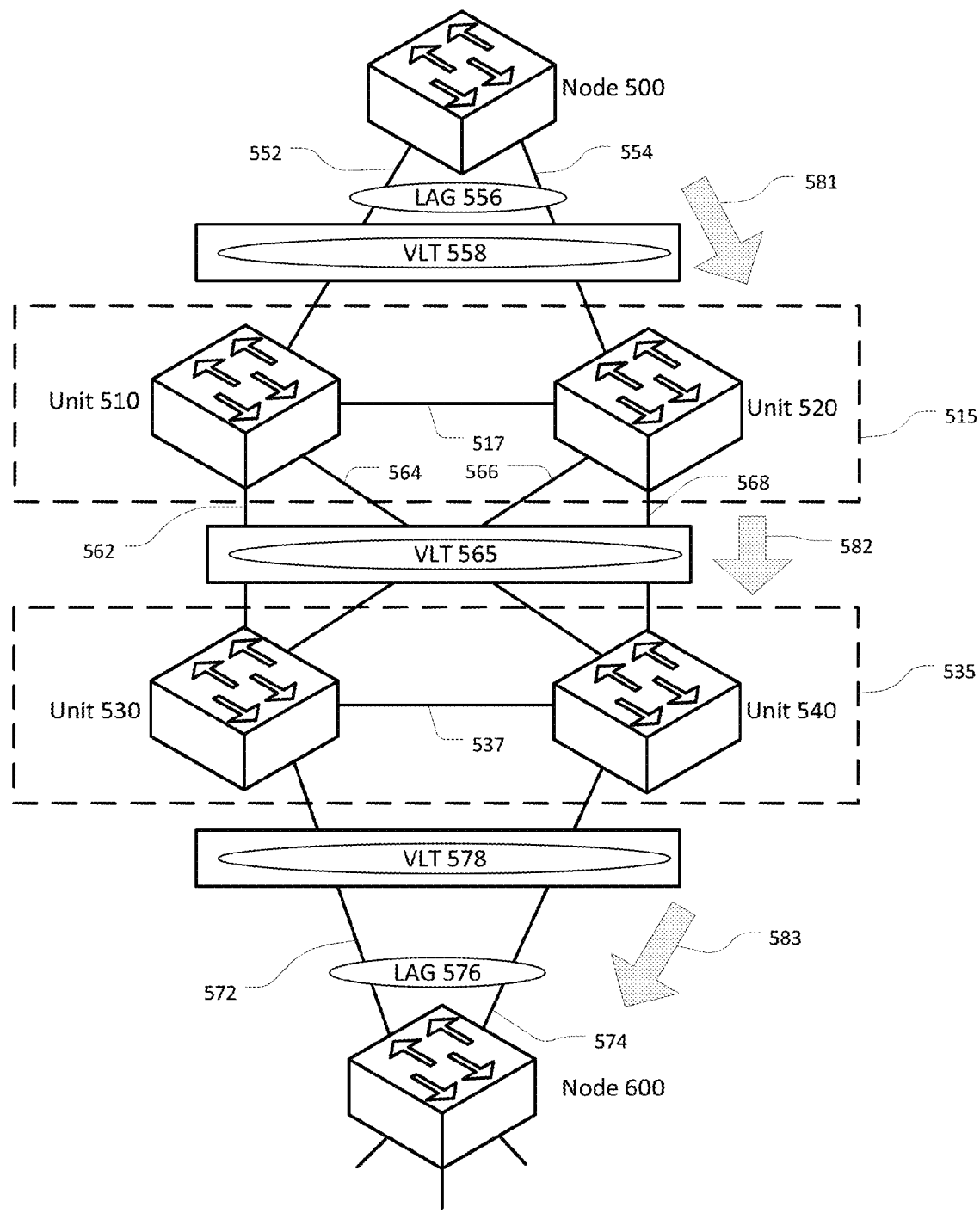
FIG. 7 shows a simplified diagram of a network including several VLANs.

FIG. 7 shows a simplified diagram of a network including several VLANs. As shown in FIG. 7, a node 500 has several options for forwarding and/or routing network packets to a node 600. More specifically, node 500 can forward packets to node 600 using one of several paths that utilize intervening network switch units 510, 520, 530, and 540. In the particular configuration of FIG. 7, node 300 may first utilize a first VLAN to reach either unit 510 along network link 552 or reach unit 520 along network link 554. Although network link 552 and network link 554 are not strictly in parallel with each other, they may form a VLAN because unit 510 and unit 520 are grouped into a first cluster 515. Even though the first cluster 515 is composed of separate unit 510 and unit 520, unit 510 and unit 520 may be treated as the same device for forwarding purposes. This is possible because, in part, unit 510 and unit 520 maintain a first intra chassis link (ICL) 517 that allows unit 510 and unit 520 to share network traffic and communicate between themselves. This means that network switching products such as node 500 may address unit 510 and unit 520 using the same prefix. In the particular example of FIG. 7, node 500 is maintaining network link 552 and network link 554 in a link aggregation group 556. This means that node 500 is aware of the parallel nature of network links 552 and 554 and may be able to more fully utilize the features of the first VLAN to which network links 552 and 554 belong. Collectively network links 552 and 554 may also form a VLT 558 between node 500 and cluster 515.

As also shown in FIG. 7, cluster 515 may utilize a second VLAN to reach either unit 530 or unit 540. Unit 510 may reach unit 530 along network link 562 or reach unit 540 along network link 564. Unit 520 may reach unit 530 along network link 566 or reach unit 540 along network link 568. Unit 530 and unit 540 may also form a second cluster 535 that also includes a second ICL 537. Because unit 510 and unit 520 are in the first cluster 515 and unit 530 and unit 540 are in the second cluster 535, the network links 562, 564, 566, and 568 may form a VLT 565. Although not shown, unit 510 may also include a LAG that combines network links 562 and 564, unit 520 may also include a LAG that combines network links 566 and 568, unit 530 may also include a LAG that combines network links 562 and 566, and unit 540 may also include a LAG that combines network links 564 and 568.

As further shown in FIG. 7, cluster 535 may utilize a third VLAN to reach node 600. Unit 530 may reach node 600 along network link 572 and unit 540 may reach node 600 along network link 574. Node 600 is treating unit 530 and unit 540 as the cluster 535. More particularly, node 600 is maintaining network link 572 and network link 574 in a LAG 576. Collectively network links 572 and 574 may also form a VLT 578 between node 600 and cluster 535.

As depicted in FIG. 7, node 500 is currently sending packets toward node 600 and beyond using one of the many possible paths in the network. More specifically, the forwarding algorithms of node 500 have identified that a usable next step or hop towards node 600 is along network link 554 to unit 520 as depicted by the flow arrow 581. In other words, node 500 is utilizing LAG 556 to reach cluster 515 and is hashing or selecting to use network link 554 from LAG 556 to do so. Unit 520 is currently sending packets toward node 600 and beyond using one of the other subpaths in the network. More specifically, the forwarding algorithms of unit 520 have identified that a usable next step or hop towards node 600 is along network link 568 to unit 540 as depicted by the flow arrow 582. In other words, unit 520 is utilizing one of the many network links in the VLT 565 to reach cluster 535. Unit 540 recognizes that it has a direct link to node 600 using network link 574 as depicted by the flow arrow 582. In this configuration, packets from node 500 to node 600 require three hops, the first along network link 554 to unit 520, the second along network link 568 to unit 540, and the third along network link 574 to node 600. Alternatively, the parallelization in the network could have been utilized to provide any one of three other three-hop routes using the first VLAN and VLT 558 to reach cluster 515 then using the second VLAN and VLT 565 to reach cluster 535, and then finally using the third LAN and VLT 578 to reach node 600. In general it would be less desirable to use ICL 517 and/or ICL 537 to forward between node 500 and node 600 as this would be a four- or five-hop route involving a longer path requiring more network switching resources.

Figure 8:
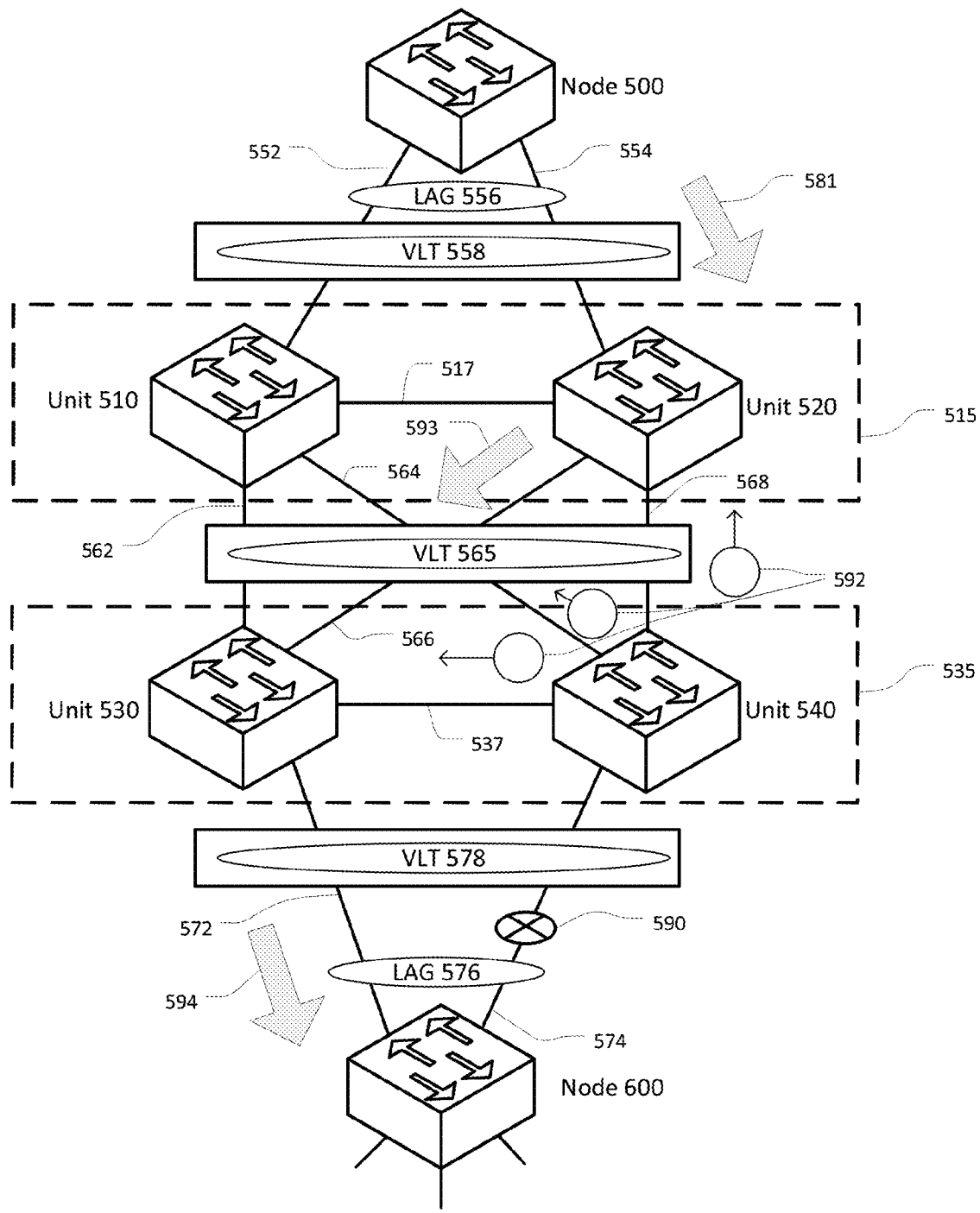
FIG. 8 is a simplified diagram of the network of FIG. 7 efficiently forwarding network traffic around a failure in a network link according to some embodiments.

FIG. 8 is a simplified diagram of the network of FIG. 7 efficiently forwarding network traffic around the failure 590 in the network link 574 according to some embodiments. As a result of the failure 590, it is no longer possible for packets to be forwarded from unit 540 to node 600 along network link 574. In a network without parallelization or redundancy, this might isolate node 600 and points beyond in the network. Such is not the case here. Unit 540 is aware that it is part of cluster 535 and VLTs 565 and 578 so that unit 540 knows that it has peer units, specifically unit 530, that can also reach node 600. However, rather than locally forwarding packets received from unit 520 along network link 568 or packets received from unit 510 along network link 564 by utilizing ICL 537, unit 540 broadcasts a route withdrawal message 592 to all of its nearest neighbors. In some embodiments, the route withdrawal message 592 may be a prefix withdrawal message under an IGP. When the route withdrawal message 592 is received by unit 520 over network link 568, unit 520 updates its forwarding data structures and recognizes that cluster 535 is now only reachable through network link 566. If unit 520 is maintaining a LAG of network links to cluster 535, it may replace that LAG with a SLAG containing network link 566. Similarly, when the route withdrawal message 592 is received by unit 510 over network link 564, unit 510 updates its forwarding data structures and recognizes that cluster 535 is now only reachable through network link 562. If unit 510 is maintaining a LAG of network links to cluster 535, it may replace that LAG with a SLAG containing network link 562. When unit 530 receives the route withdrawal message 592 along ICL 537, unit 530 would ignore the route withdrawal message 592 by recognizing that it already has a direct route to node 600 along network link 572. Each of the forwarding data structure updates has the desired effect of having cluster 515 direct or polarize packets for node 600 that avoid unit 340. As shown in FIG. 8, node 500 may continue to forward packets for node 600 to unit 520 along network link 554 as depicted by flow arrow 581. Once the packets arrive at unit 520 they may then be forwarded to unit 530 along network link 566 as depicted by flow arrow 593 and from there to node 600 along network link 574 as depicted by flow arrow 594. Thus, a three-hop path is maintained between node 500 and node 600 that does not unnecessarily consume the resources of ICL 537 or unit 540.

When failure 590 is corrected and network link 574 is again available between unit 540 and node 600, the effects of the route withdrawal message 590 may be reversed. Unit 540, recognizing that network link 574 is again available, may broadcast a route reachability message to the neighboring network switching devices, and units 510 and 520 may update their forwarding data structures accordingly. Unit 510 may add network link 564 to its SLAG to cluster 535 and unit 520 may add network link 568 to its SLAG to cluster 535. This would make network links 564 and 568 available for use in forwarding packets between cluster 515 and cluster 535.

As discussed above and further emphasized here, FIGS. 7 and 8 are merely examples, which should not unduly limit the scope of the claims. One of ordinary skill in the art would recognize many variations, alternatives, and modifications. According to some embodiments, the cluster 515 and/or the cluster 535 may include more than two units functioning in parallel. This arrangement allows adjoining nodes and clusters to choose from multiple forwarding paths that still exist through the cluster 515 and/or the cluster 535 during network failures. According to some embodiments, a failure in network link 568 may be efficiently accommodated through a corresponding route withdrawal message broadcast by unit 520. In this case, node 500 would forward packets to cluster 515 along network link 352 in a fashion similar to the embodiments of FIG. 6. Unit 510 would ignore the route withdrawal message from unit 520 knowing that it has its own direct links to cluster 535. According to some embodiments, the forwarding approach may be used to forward layer 2 network traffic around the failure 590. According to some embodiments, the forwarding approach may be used to forward layer 3 network traffic around the failure 590.

Figure 9:
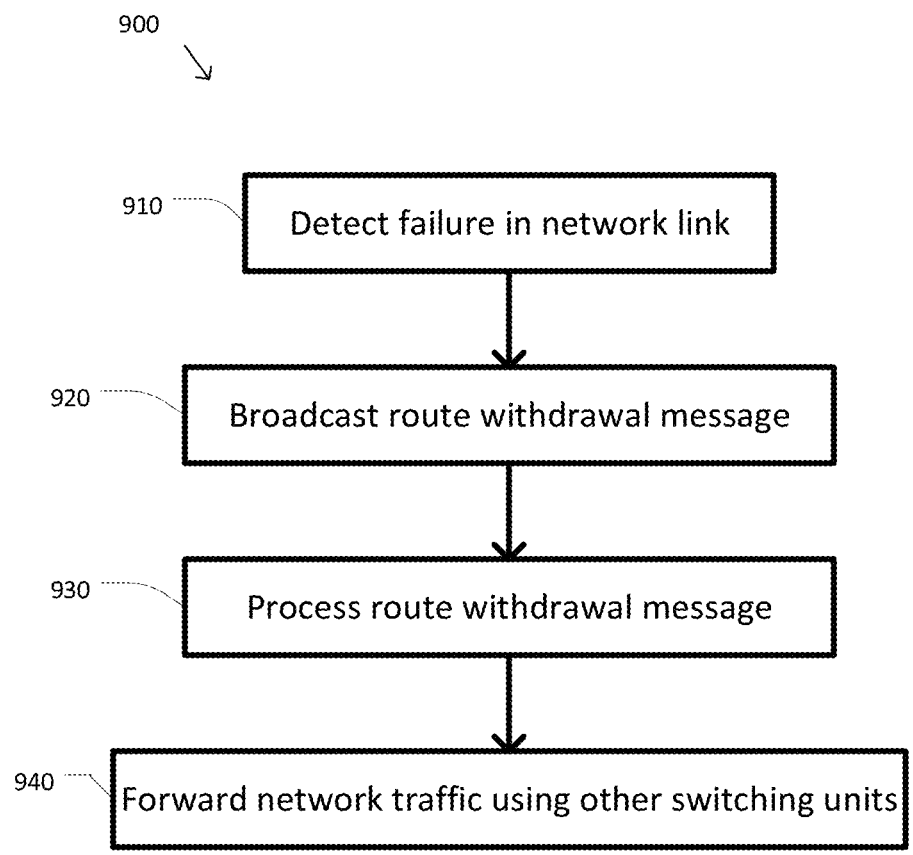
FIG. 9 is a simplified diagram showing a method of traffic polarization during failures according to some embodiments.

FIG. 9 is a simplified diagram showing a method 900 of traffic polarization during failures according to some embodiments. As shown in FIG. 9, the method 900 includes a process 910 for detecting a failure in a network link, a process 920 for broadcasting a route withdrawal message, a process 930 for processing the route withdrawal message, and a process 940 for forwarding network traffic using other switching units. According to certain embodiments, the method 900 of traffic polarization during failures can be performed using variations among the processes 910-940 as would be recognized by one of ordinary skill in the art. In some embodiments, one or more of the processes 910-940 of method 900 may be implemented, at least in part, in the form of executable code stored on non-transient, tangible, machine readable media that when run by one or more processors (e.g., the nodes 100, 200, 300, 400, 500, and 600 and units 110, 120, 310, 320, 510, 520, 530, and 540) may cause the one or more processors to perform one or more of the processes 910-940.

At the process 910, a network switching unit (e.g., the units 120, 320, and/or 520) detects a failure (e.g., the failures 160, 360, and/or 590) in a network link (e.g., the network links 144, 344, and/or 574) coupling the network switching unit to a network node (e.g., the nodes 200, 400, and/or 600). In some embodiments, the failure prevents the network switching unit from forwarding network traffic directly to the network node.

At the process 920, the network switching unit broadcasts a route withdrawal message (e.g., the route withdrawal message 170, 370, and/or 592) to its neighboring network switching devices (e.g., when the network switching unit is unit 120 then unit 110 and node 100, when the network switching unit is unit 320 then unit 310 and node 300; and/or when the network switching unit is unit 540 then units 510, 520, and 530). In some embodiments, the route withdrawal message may be a prefix withdrawal message under an IGP.

At the process 930, each of the neighboring network switching devices process the route withdrawal message. If the neighboring network switching device is in a same cluster as the network switching unit (e.g., when the network switching unit is unit 120 then unit 110, when the network switching unit is unit 320 then unit 310; and/or when the network switching unit is unit 540 then unit 530), then the neighboring switching device ignores the route withdrawal message by recognizing that it already has a direct route that avoids the failure. If the neighboring switching device is not in the same cluster as the network switching unit (e.g., when the network switching unit is unit 120 then node 100, when the network switching unit is unit 320 then node 300; and/or when the network switching unit is unit 540 then units 510 and 520), then the neighboring switching device may update its forwarding data structures to avoid using the network switching unit when forwarding network traffic to the cluster. In some embodiments, if the network switching device is maintaining its network links to the cluster in a LAG, the network switching device may create a sub-LAG containing all of the network links in the LAG except the network link coupling the network switching device to the network switching unit.

At the process 940, network traffic is forwarded using switching units in the cluster other than the network switching unit. In some embodiments, the network switching device may forward network traffic to the cluster using network links other than the network link coupling the network switching device to the network switching unit. In some embodiments, if the network switching device is maintaining its network links to the cluster using the sub-LAG, the network traffic may be forwarded to the cluster using the network links in the sub-LAG.

Some embodiments of nodes 100, 200, 300, 400, 500, and 600 and units 110, 120, 310, 320, 510, 520, 530, and 540 may include non-transient, tangible, machine readable media that include executable code that when run by one or more processors may cause the one or more processors to perform the processes of method 900 as described above. Some common forms of machine readable media that may include the processes of method 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIG. 9 is merely an example, which should not unduly limit the scope of the claims. One of ordinary skill in the art would recognize many variations, alternatives, and modifications. According to some embodiments, the method 900 further includes a process for the network switching unit to detect that the failure has been corrected, a process for the network switching unit to broadcast a route reachability message to the neighboring network switching devices, and a process for processing the route reachability message where each of the network switching devices may update their forwarding data structures accordingly. In some embodiments, if the network device is maintaining its network links to the cluster using the sub-LAG, the network switching device may recreate the LAG and use the LAG to forward network traffic to the cluster. According to some embodiments, the method 900 may be used to polarize layer 2 network traffic. According to some embodiments, the method 900 may be used to polarize layer 3 network traffic.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A communication network cluster, comprising:
a first network switching unit configured to connect to a first network node via a first network link and a second network node via a second network link;
a second network switching unit configured to connect to the first network node via a third network link and the second network node via a fourth network link; and
a first intra-cluster link coupling the first network switching unit to the second network switching unit;
wherein:
the first and second network switching units are further configured to receive network traffic forwarded from the first network node for the second network node via a link aggregation group (LAG) including the first and third network links;
the second network switching unit is further configured to respond to a failure in the fourth network link by broadcasting a route withdrawal message to the first network switching unit and the first network node; and
in response to the route withdrawal message, the first network switching unit is further configured to accept rerouted network traffic for the second network node from the first network node via a sub-LAG including the first network link but not the third network link.

2. The cluster of claim 1, wherein the first network switching unit is configured to leave its forwarding behavior unchanged in response to the route withdrawal message.

3. The cluster of claim 1, wherein the second network link and the fourth network link form a virtual link trunk.

4. The cluster of claim 1, wherein the route withdrawal message is a prefix withdrawal message of an interior gateway protocol.

5. The cluster of claim 1, wherein the second network switching unit is further configured to broadcast a route reachability message when the failure in the fourth network link is corrected.

6. The cluster of claim 1, wherein:
the second network switching unit is further configured to:
connect to a third network node via a fifth network link; and
respond to the failure in the fourth network link by broadcasting the route withdrawal message to the third network node;
the first network switching unit is further configured to:
connect to the third network node via a sixth network link; and
accept rerouted network traffic from the third network node via the sixth network link resulting from the route withdrawal message.

7. The cluster of claim 6, wherein the first network link, the third network link, the fifth network link, and the sixth network link form a virtual link trunk.

8. A network switching device, the network switching device comprising:

a first communication port configured to connect the network switching device to a first network switching unit in a cluster via a first network link;
a second communication port configured to connect the network switching device to a second network switching unit in the cluster via a second network link; and
a link aggregation group (LAG) including the first network link and the second network link, the network switching device using the LAG to forward network traffic to the cluster;
wherein the network switching device is configured to, in response to receiving a route withdrawal message from the second network switching unit indicating a network failure in a third network link connecting the second network switching unit and a second network node:
create a sub-LAG including all of the network links included in the LAG with the exception of the second network link; and
forward network traffic for the second network node to the second network switching unit using the sub-LAG for forwarding to the second network node via a fourth network link connecting the first network switching unit and the second network node.

9. The network switching device of claim 8, wherein in further response to receiving the route withdrawal message, the device updates an ARP data structure to map network addresses associated with the cluster to the sub-LAG.

10. The network switching device of claim 8, wherein the first network link and the second network link form a virtual link trunk.

11. The network switching device of claim 8, wherein the route withdrawal message is a prefix withdrawal message of an interior gateway protocol.

12. The network switching device of claim 8, wherein the network switching device is further configured to respond to a route reachability message received from the second network switching unit indicating reachability of the third network link between the second network switching unit and a second network node by forwarding network traffic for the second network node to the second network switching unit through the second network link.

13. The network switching device of claim 8, wherein the network switching device is further configured to respond to a route reachability message received from the second network switching unit indicating reachability of the third network link between the second network switching unit and the second network node by creating the LAG including the first network link and the second network link for forwarding network traffic for the second network node to the cluster.

14. A method of forwarding network traffic in a network switching device, the method comprising:
forwarding, by a first network switching device, network traffic for a second network switching device via a cluster using a link aggregation group (LAG) connecting the first network switching device to the cluster;
receiving, by the first network switching device, on a first network link, a route withdrawal message from a first network switching unit in the cluster indicating a network failure in a second network link connecting the first network switching unit and the second network switching device; and
in response to the route withdrawal message:
updating forwarding data structures in the first network switching device to remove the first network link from the LAG to create a sub-LAG connecting the first network switching device to the cluster, the sub-LAG including each network link from the LAG except for the first network link; and forwarding network traffic for the second network switching device to a second network switching unit in the cluster via the sub-LAG for forwarding by the second network switching unit to the second network switching device via a third network link connecting the second network switching device to the second network switching unit.

15. An information handling system comprising:

a communications network, the communications network including:

a first network node coupled to a cluster; and the cluster including a first network switching unit connected to a second network switching unit through an intra chassis link, the first network switching unit being connected to the first network node through a first network link, and the second network switching unit being connected to the first network node through a second network link;

wherein:

the first network switching unit is configured to connect to a second network node via a third network link;

the second network switching unit is configured to connect to the second network node via a fourth network link;

the second network switching unit is configured to respond to a failure in the fourth network link by broadcasting a route withdrawal message to the first network switching unit and the first network node; and the first network node is configured to:

forward network traffic for the second network node via the cluster using a link aggregation group (LAG) including the first and second network links; and respond to the route withdrawal message by creating a sub-LAG including the first network link but not the second network link and forwarding network traffic for the second network node to the first network switching unit via the sub-LAG.

* * * * *